B. J. BECK, Dec'd,

KOCH SONS & CO., Assignees.

SCRAP BOOK.

No. 9,952. Reissued Nov. 29, 1881.

Witnesses
Chas. H. Smith
J. Hait

Koch, Sons & Company
Assignee of Bernard J. Beck
Inventor
per Lemuel W. Serrell
Atty.

N. PETERS. Photo-Lithographer. Washington. D. C.

UNITED STATES PATENT OFFICE.

KOCH SONS & CO., OF NEW YORK, N. Y., ASSIGNEES OF BERNARD J. BECK, DECEASED.

SCRAP-BOOK.

SPECIFICATION forming part of Reissued Letters Patent No. 9,952, dated November 29, 1881.

Original No. 175,327, dated March 28, 1876. Application for reissue filed April 20, 1881.

*To all whom it may concern:*

Be it known that BERNARD J. BECK, of Brooklyn, in the State of New York, did invent an Improvement in Scrap-Books, of which the following is a specification.

In the manufacture of scrap-books it is usual to place strips of folded paper between the respective leaves, so as to fill out the back and make the same firm, but leave the space necessary between the leaves for the scraps or sheets of paper to be attached to the leaves. This operation is attended with difficulty and loss of time, because the separate strips are liable to become misplaced in cutting the grooves for the back cords, and often these filling-pieces slip out of place by the clamping pressure, and the parts have to be put in position again, and the workman loses time, and the book-back is not strong and uniform.

This improvement relates to a backing-piece in which the material is folded in opposite directions to produce channels into which the back folds of the sheets are introduced and secured. The folded material of the back intervening between the sheets forms filling-pieces that keep the sheets sufficiently separate for the purposes of a scrap-book. The scrap-book back is made of one or more thicknesses, and the reverse folds are parallel, and the back with its filling-pieces that intervene between the sheets is prepared for use separately from the sheets, and the two are put together in making the book. By this construction the book is made much stronger than heretofore, because the back is in one continous sheet, folded, and the separate detached pieces heretofore used are dispensed with.

Figure 1:
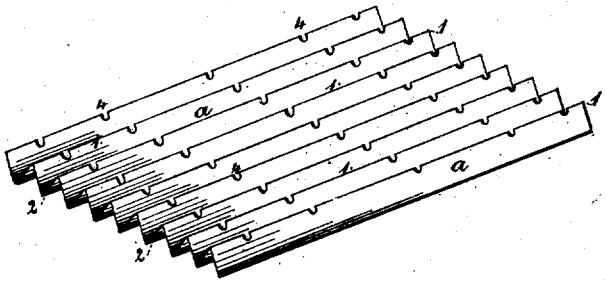
Figure 2:
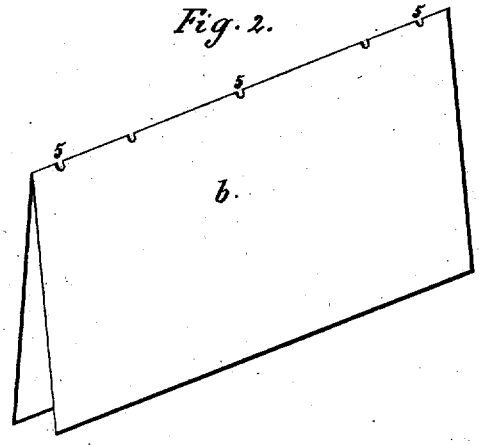
Figure 3:
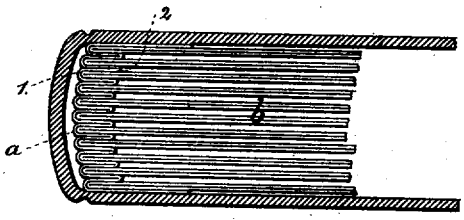

In the drawings, Figure 1 is a perspective view of the back filling-piece. Fig. 2 is a perspective view of one of the sheets, and Fig. 3 is a section of the back as complete.

The back piece or guard, *a*, is made of one sheet of the proper thickness, or of two or more layers or sheets. The folds 1 1 are made in one direction; the folds 2 2 are intermediate, and made in the other direction. This may be done by dies or fluted rollers. The number of folds and intermediate channels will be regulated according to the thickness of the book, and the length of the back-strip will correspond to the length of the folded sheet *b* at the back.

In order to prepare the back for sewing the sheets to the same, it is preferable to compress the folds tightly together and cut the folds at the back with the register-notches or saw-cuts 4, usually employed for the attaching-cords to pass into, and similar notches, 5, are cut in the edges of the folded sheets, so that the parts will correspond when the folded sheets are placed successively into the channels between the folds of the back and secured into place.

The manner of sewing is well known to bookbinders, and need not be described, as the same is to be of any usual character.

When the book has been sewed, the back is to be glued, and the covers attached in the ordinary way. The back will be very strong, because the glue will pass in between the folds of the backing-piece, and the backing-piece is continuous throughout, instead of being in separate pieces.

Scrap-books have been made with filling-pieces between the sheets, and these filling-pieces have either been attached to the back, or else formed by a narrow fold at the back edges of the sheets. In these cases the before-mentioned difficulties arise, and a bellows-back has been used in a folio or paper-file, but the folds were not connected and could be expanded or compressed, and did not form a book with a rounded back.

In the present improvement the back cannot be expanded, because the cords or connections between the folded portions are permanent, and the material of the filling-pieces, extending from one filling-piece to the next and being permanently connected, become a part of the back.

What is claimed as the invention of said B. J. BECK, is—

1. In a scrap-book, the combination, with the leaves, of intervening filling-pieces folded in opposite directions, and a connection across the back uniting the back edges of such filling pieces, substantially as specified.

2. In a scrap-book, a back having filling-pieces to come between the leaves, which filling-pieces form an integral part of the back and are permanently connected at their back edges, substantially as set forth.

Signed this 11th day of April, A. D. 1881.

KOCH SONS & CO.,
By WM. C. HORN.

Witnesses:
HAROLD SERRELL,
WILLIAM G. MOTT.